Sept. 19, 1961   L. A. RUNTON   3,000,771
CONVEYOR BELTS
Filed May 1, 1958

INVENTOR
LESLIE A. RUNTON
BY
ATTORNEY

United States Patent Office 3,000,771
Patented Sept. 19, 1961

3,000,771
CONVEYOR BELTS
Leslie A. Runton, Middle Haddam, Conn., assignor to The Russell Manufacturing Company, Middletown, Conn., a corporation of Connecticut
Filed May 1, 1958, Ser. No. 732,271
1 Claim. (Cl. 154—52.1)

This invention relates to conveyor belts and has for an object to provide a light weight, tear resistant, highly flexible and dimensionally stable belt.

Another object is to provide a belt in which the longitudinal pull is resisted by straight parallel cords having a high degree of dimensional stability located at the center pitch line of the belt and the outer plies are composed of tear resistant fillerwise yarns woven to possess the extensibility and contractability required to permit the belt to flex about its center pitch line for passing around rollers.

Other objects and advantages will be apparent as the nature of the invention is more fully disclosed.

In accordance with this invention the belt is of the multi-ply construction, having an inner or center ply composed of straight parallel cords of high tensile strength and high dimensional stability, such as Fortisan, Dacron, cellulose acetate, bound by suitable filler and binder yarns into a compact weave. The outer plies are of multi-ply weave having a pair of rows of filler yarns, at least the outer row being composed of a high tensile material such as nylon, spun Dacron or acetate in relatively large size. The filler yarns are bound by binder yarns so woven as to impart a high degree of compressibility and extensibility to the outer ply. The various plies are impregnated with and secured together by suitable elastomeric resins such as polyvinyl chloride, natural rubber latex or the like, cured and vulcanized to a flexible, resilient state.

The nature of the invention will be better understood from the following description, taken in connection with the accompanying drawing in which a specific embodiment has been set forth for purposes of illustration.

Figure 3:
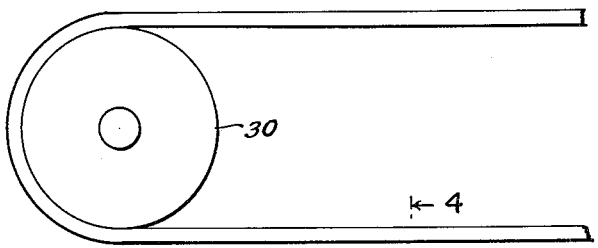
FIG. 3 is a broken perspective of the belt.
Figure 1:
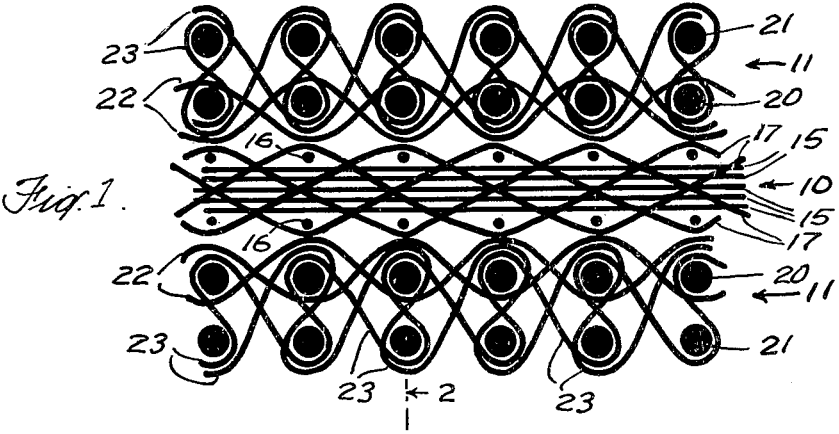
FIG. 1 is a warpwise diagram illustrating the improved weave.
Figure 2:
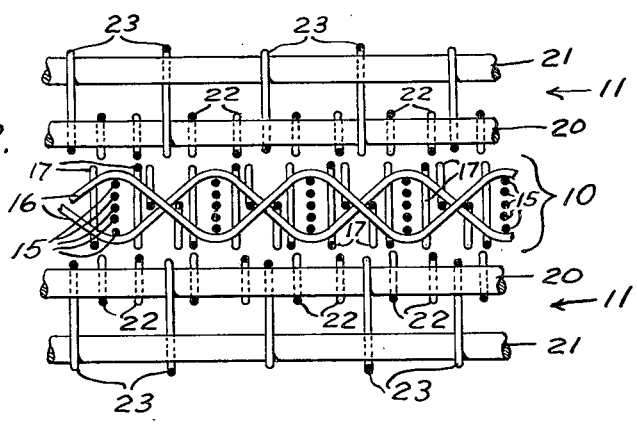
FIG. 2 is a partial fillerwise section taken on the line 2—2 of FIG. 1.
Figure 4:
FIG. 4 is a transverse section taken on the line 4—4 of FIG. 3 but on a larger scale.

Referring to the drawing more in detail the fabric is shown as comprising a center ply 10 and outer plies 11 disposed on opposite sides thereof to form the outer belt surfaces.

The center ply 10 is composed of groups of straight, parallel, warpwise cords 15 bound by filler yarns 16 disposed above and below the cords 15 and interwoven with binder yarns 17 passing around the filler yarns 16 and between the groups of cords 15. The cords 15 constitute the load carrying elements and are composed of a dimensionally stable material as above stated. The yarns 16 and 17 are smaller and more flexible than the cords 15 so that the latter remain straight and parallel in the final weave.

The ply 10 is impregnated with an elastomeric resin such as polyvinyl chloride or a natural rubber latex and heat set or vulcanized to a flexible, resilient state.

The outer plies 11 are composed of inner and outer rows of filler yarns 20 and 21 respectively. The inner rows 20 are bound by a double chain 22. The outer rows 21 are bound by a binder warp which extends alternately under a filler yarn 20 of the inner row and over a filler yarn 21 of the outer row.

There are no chains extending directly between successive filler yarns 21 of the outer row. Hence these yarns 21 are free to shift longitudinally as the fabric flexes to pass around a roller.

The yarns 21 are large in diameter as compared to the chains 22 and binders 23 and are composed of a tear resistant material such as nylon or Dacron.

The plies 11 are impregnated with an elastomeric resin such as neoprene and cured. They are then placed on opposite sides of the cured ply 10 and bonded thereto by a plastic adhesive such as natural rubber latex. The assembly is heat cured or vulcanized in the usual manner to form a unitary structure.

The belt is shown in FIG. 3 as passing around a roller 30 forming a part of a conveyor system. As the belt flexes the dimensionally stable cords 15 constitute the pitch line and the outer plies expand and contract as required for the flexing to take place. The neoprene is resilient and elastic to serve this purpose and the outer filler yarns 21 of the outer plies 11 are free to shift longitudinally with the neoprene coating.

Any tearing of the surface of the belt due to hooks or the like is resisted by the heavy filler yarns 21 which absorb the shock and resist the tearing action without transmitting the tearing force to the other plies of the belt.

Although a specific embodiment has been shown for purposes of illustration, the invention is adapted for various uses and may be embodied in various forms as will be apparent to a person skilled in the art.

What is claimed is:

A conveyor belt comprising inner and outer plies of woven fabric, said inner ply having groups of straight, parallel cords of dimensionally stable material, filler yarns disposed above and below said cords and bound by binder yarns extending between the upper and lower filler yarns and passing between said cords, the outer plies each comprising inner and outer rows of filler yarns, chain yarns binding the filler yarns of the inner row, binder yarns binding each outer filler yarn to an inner filler yarn with the outer filler yarns free to shift longitudinally to permit flexing of the belt said inner and outer plies being mechanically independent to permit relative longitudinal displacement as the belt flexes around a pully, and an elastomeric resin impregnating said plies and bonding the plies into a unitary structure.

References Cited in the file of this patent

UNITED STATES PATENTS

| | | |
|---|---|---|
| 610,051 | Hey | Aug. 30, 1898 |
| 684,980 | Dorman | Oct. 22, 1901 |
| 1,405,158 | Petersen | Jan. 31, 1922 |
| 2,112,544 | Rice | Mar. 29, 1938 |
| 2,195,591 | Hanff et al. | Apr. 2, 1940 |
| 2,541,231 | Fligg | Feb. 13, 1951 |
| 2,804,886 | White | Sept. 3, 1957 |

FOREIGN PATENTS

| | | |
|---|---|---|
| 770,524 | Great Britain | Mar. 20, 1957 |